Oct. 13, 1964  F. L. BOYS  3,152,946
OSCILLATING, FILM FORMING, EVAPORATING APPARATUS
Filed Aug. 28, 1962
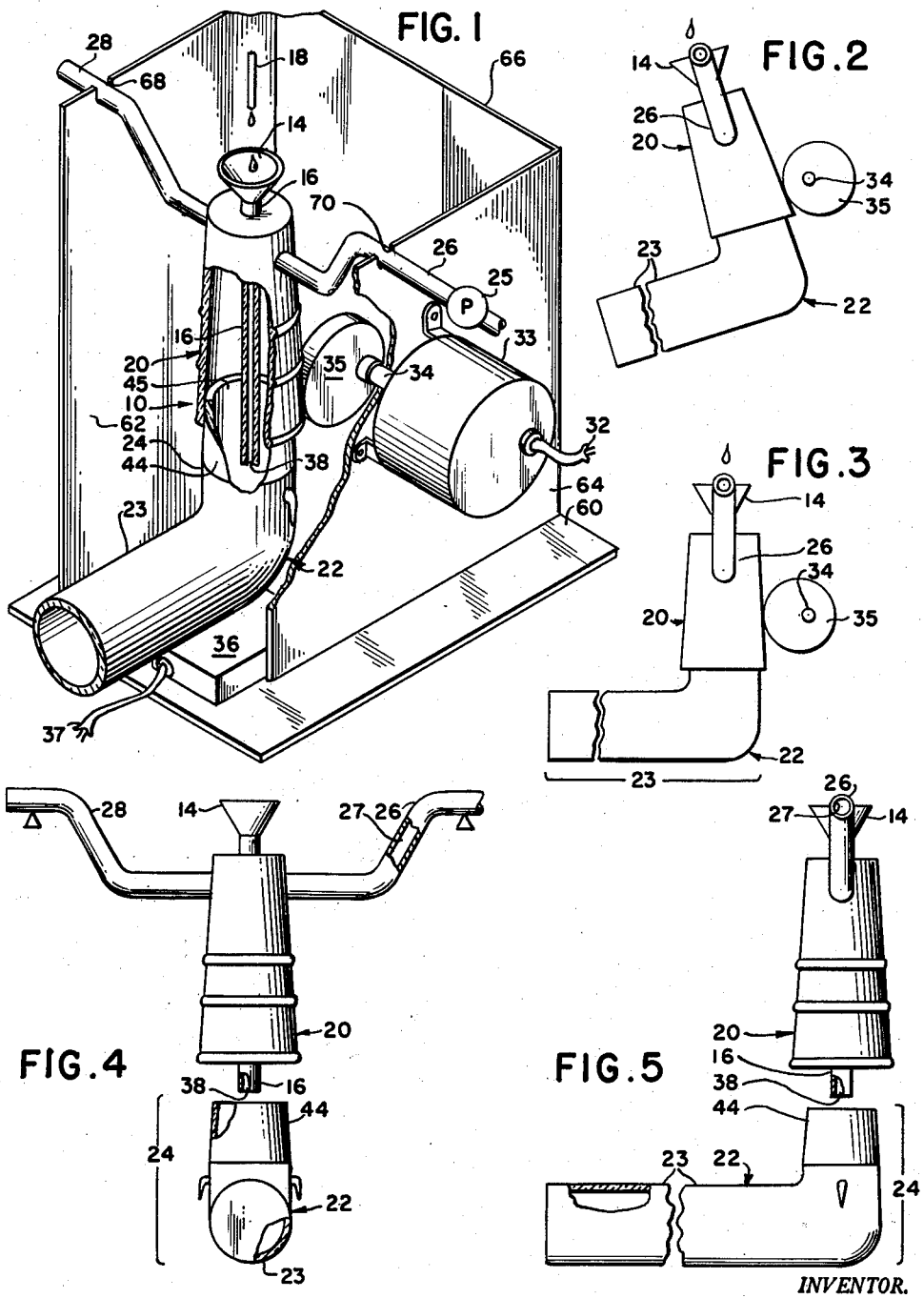
INVENTOR.
FAY L. BOYS
BY
Adams, Forward & McLean
ATTORNEYS United States Patent Office 3,152,946
Patented Oct. 13, 1964

3,152,946
OSCILLATING, FILM FORMING, EVAPORATING APPARATUS
Fay L. Boys, Peotone, Ill., assignor to Sinclair Research, Inc., New York, N.Y., a corporation of Delaware
Filed Aug. 28, 1962, Ser. No. 219,912
4 Claims. (Cl. 159—1)

My invention relates to the removal of solvents from liquid solutions and in particular provides apparatus for removal of solvents from solutions produced in liquid elution chromatography.

When small samples of material are eluted through a column by large quantities of a succession of solvents, conventionally the solvents are separated from the solutions by subjecting each solution to vacuum alone or in combination with heating after collecting each solution in a vessel and transferring it to a steam bath or vacuum oven. Transferring such vessels involves the risk of losing samples due to spilling, breaking or misplacement of containers; collection of large volumes of flammable and toxic solvents over a substantial period of time is hazardous; and if solid materials are included in the sample, bumping and splashing frequently result in loss of samples and contamination of adjacent containers.

It is an object of my invention to provide apparatus for the removal of solvents from liquid solutions after collection which eliminates the necessity of transferring the collection vessel to other devices for the application of heat or vacuum.

It is another object of my invention to provide such an apparatus in which substantial quantities of solvents, which can be flammable or toxic, are not accumulated for any significant period of time.

It is a further object of my invention to provide such an apparatus in which the danger of sample loss or contamination of other containers due to bumping or splashing is overcome.

In accordance with my invention I provide an apparatus for continuous removal of solvents from liquid solutions by heating, vaporization and evacuation of the solvents from a closed chamber having a lower surface extending in a generally horizontal direction. An inlet capillary tube extends through the upper portion of the chamber and communicates between the interior and the exterior of the chamber. The chamber is pivotally supported permitting oscillation of the chamber and means cooperating with the chamber are provided actuating oscillation of the chamber between a first position in which the lower surface is disposed in a first angular relationship relative to the horizontal and a second position in which the lower surface is disposed in a second angular relationship relative to the horizontal. Heating means are provided to supply heat to at least a portion of the lower surface and evacuating means are connected to the chamber.

Advantageously, the chamber can be provided with a pair of arms extending outwardly in opposite directions from the upper portion of the chamber, which arms can be pivotally supported. One of the pair of arms can be hollow and such arm can be employed to interconnect the chamber and the evacuating means.

Also advantageously, the means actuating oscillation of the chamber can include a cam, such as an eccentrically mounted circular cam, bearing against a portion of the exterior of the chamber along an area intermediate the upper portion and the lower surface of the chamber.

For a more complete description of my invention reference is made to the attached drawing in which:

FIGURE 1 is an isometric, partially sectioned view of an apparatus embodying my invention;

FIGURE 2 is a schematic drawing of the apparatus shown in FIGURE 1 illustrating the operation of an eccentrically mounted cam used to oscillate the chamber;

FIGURE 3 is a schematic drawing of the apparatus shown in FIGURES 1 and 2 after the cam has been rotated;

FIGURE 4 is an exploded, fragmentary front view of the major components of the apparatus shown in FIGURE 1; and FIGURE 5 is an exploded, fragmentary side view of the major components of the apparatus shown in FIGURE 1.

Referring to the drawing, the reference numeral 10 designates a fraction collector including a funnel 14 with a dependent capillary tube 16 having a longitudinal capillary bore 38 extending therethrough, a collector head 20 and a hollow L-shaped collector tube 22 having a short upper upright portion 24 and a lower extended transverse portion 23, shown cut away at its end in FIGURE 1. Collector head 20 is frusto-conical in shape and is open at the bottom and closed at the top. The funnel 14 is located immediately above collector head 20 with the dependent capillary tube 16 extending through the closed top and below the open bottom of collector head 20. This latter can best be seen in FIGURES 4 and 5. The upright portion 24 of collector tube 22 is provided with a tapered section 44 at its upper end so that the tapered section 44 mates with and frictionally engages the interior of collector head 20 in sealing contact. When collector head 20 and collector tube 22 are assembled as shown in FIGURE 1, the end of capillary tube 16 extends into the interior of the upright portion 24 of collector tube 22.

As can be seen in the drawing, particularly in FIGURES 4 and 5, the fraction collector 10 also includes a pair of arms 26 and 28 extending outwardly in opposite directions from the upper portion of collector head 20. Each of the arms 26 and 28 is bent upwardly and then outwardly again in a crank shape so that at least a portion of each of arms 26 and 28 removed from collector head 20 lies in the same plane as the mouth of funnel 14. Arm 26 is further provided with a hollow interior passageway 27 communicating between the interior of collector head 20 and vacuum pump 25. The connection with vacuum pump 25 is shown in FIGURE 1.

A mounting rack including a horizontal base member 60, opposing upright side walls 62 and 64 and an upright back wall 66 is provided to support the elements of the apparatus. A pair of bearing slots 68 and 70 are provided in the tops of side walls 62 and 64, respectively, and receive the arms 28 and 26, respectively. Side walls 62 and 64 are spaced apart a sufficient distance so as to receive the portions of arms 26 and 28 lying in the same plane as the mouth of funnel 14, thereby permitting the oscillation of fraction collector 10 about an axis passing through the arms 26 and 28 and the mouth of funnel 14.

An outlet 18, such as the outlet from a liquid elution chromatography column, is positioned above the funnel 14. An electric heating element 36 powered through power line 37 is positioned on rack base 60 below the collector tube 22. A circular cam 35, bearing against the surface of collector head 20, is eccentrically mounted on a shaft 34 which passes through an opening in the rack side wall 64. The shaft 34 is driven by electric motor 33 mounted on side wall 64 and powered through power line 32.

In operation, a liquid sample, including solvent and solute, such as a solution eluted through a chromatography column, drips through outlet 18 into funnel 14. The sample is then pulled along with air through the capillary bore 38 of capillary tube 16 by means of the vacuum applied by vacuum pump 25. The combination of expansion, vacuum, and air turbulence vaporizes most of the solvent and the solvent vapor is swept through passageway 27 in arm 26 to the vacuum system. The remainder of the sample, including any residual solvent, falls from the capillary tube 16 onto heated zone of the extended transverse portion 23 of collection tube 22, resulting in further solvent volatilization. If solvent still remains, it has repeated chances for evaporation in that during each cycle the cam 35 causes the fraction collector 10 to oscillate thereby moving the extended transverse portion 23 from a slanted to a horizontal position. This causes the solute plus any residual solvent to flow repeatedly as a thin film over the heated zone of collection tube 22. After the solvent has been completely removed, the collection tube 22 now containing the solute can be separated from collector head 20 and the entire quantity of solute from the original sample can be removed for further analysis.

Thus, the apparatus of my invention provides a combination of several actions in order to remove solvent from a sample; i.e. (1) expansion from a capillary, (2) turbulent air sweep, (3) application of partial vacuum, (4) mechanical agitation, and (5) the repeated application of heat to a thin film of the sample containing residual solvent.

It will also be noted that in an apparatus such as that illustrated in the drawing solvent removal is continuously effected directly from the collecting vessel as the sample is introduced into the collecting vessel. It is, therefore, unnecessary to transfer the collection vessel to a separate steam bath or vacuum oven to effect vaporization of the solvent. Furthermore, since at least partial solvent vaporization is effected immediately as the sample leaves the capillary tube and solvent vapor is continuously removed from the closed chamber, no substantial quantity of solvent is collected under potentially dangerous conditions such as collecting a complete fraction in a beaker before attempting solvent removal. Also, there is no danger of losing a portion of the sample or contaminating another container as a result of splashing since a closed collecting vessel is employed in my invention.

I claim:

1. An apparatus for removal of solvents from liquid solutions including a first means defining a closed chamber having an extended lower surface, an inlet capillary tube extending through the upper portion of said first means and communicating between the interior and exterior of said chamber, means pivotally supporting said first means permitting oscillation of said chamber, second means cooperating with said first means actuating oscillation of said chamber between a first position in which said lower surface is disposed in a first angular relationship relative to the horizontal and a second position in which said lower surface is disposed in a second angular relationship relative to the horizontal, means supplying heat to at least a portion of said lower surface, and evacuating means connected to said chamber.

2. The apparatus of claim 1 in which said first means defining said chamber includes a pair of arms extending generally, horizontally outward in opposite directions from the upper portion thereof, said arms being pivotally supported, one of said arms being hollow and said hollow arm interconnecting said chamber and said evacuating means.

3. The apparatus of claim 1 in which the means actuating oscillation of said chamber includes a cam bearing against a portion of said first means defining said chamber along an area thereof intermediate said upper portion and said lower surface.

4. An apparatus for removal of solvents from liquid solutions including a generally, vertically disposed hollow frusto-conical member closed at its upper end and open at its lower end, an inlet capillary tube extending vertically through the closed upper end of said frusto-conical member, the upper end of said inlet tube being provided with a collecting funnel, the lower end of said inlet tube extending beyond the lower end of said frusto-conical member, a pair of arms extending generally, horizontally outward in opposite directions from the frusto-conical member proximate the upper end thereof, one of said arms being hollow and communicating at one end thereof with the interior of said frusto-conical member and communicating at the other end thereof with an evacuating means, means pivotally supporting said arms for oscillation about an axis passing through said arms at their points of support and the mouth of said collecting funnel, a hollow L-shaped member having a short upright portion and an extended transverse portion, said L-shaped member being closed at the end of the transverse portion thereof and open at the top of the upright portion thereof, the exterior of said upright portion being tapered and in sealing engagement with the interior of said frusto-conical member thereby defining a closed chamber within said L-shaped member and said frusto-conical member, means actuating oscillation of said frusto-conical member and said L-shaped member between a first position in which said transverse portion is disposed substantially horizontal and a second position in which said transverse portion is disposed in an angular relationship relative to the horizontal such that said closed end is below the horizontal, and means supplying heat to at least the section of said transverse portion proximate said upright portion of said L-shaped member.

References Cited in the file of this patent

UNITED STATES PATENTS

| | | |
|---|---|---|
| 2,770,557 | Atti | Nov. 13, 1956 |
| 2,821,160 | Atti | Jan. 28, 1958 |
| 2,902,973 | Weingarten et al. | Sept. 8, 1959 |
| 2,986,280 | Magnuson et al. | May 30, 1961 |